(12) United States Patent
Chu

(10) Patent No.: US 9,081,083 B1
(45) Date of Patent: Jul. 14, 2015

(54) ESTIMATION OF TIME DELAY OF ARRIVAL

(75) Inventor: Wai C. Chu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 639 days.

(21) Appl. No.: 13/169,826

(22) Filed: Jun. 27, 2011

(51) Int. Cl.
*G01S 5/20* (2006.01)
*G01S 5/22* (2006.01)

(52) U.S. Cl.
CPC ..... *G01S 5/20* (2013.01); *G01S 5/22* (2013.01)

(58) Field of Classification Search
CPC .................................. G01S 5/20; G01S 5/22
USPC ......................................................... 367/127
See application file for complete search history.

(56) References Cited

U.S. PATENT DOCUMENTS

| | | | | |
|---|---|---|---|---|
| 5,570,099 | A * | 10/1996 | DesJardins ................... | 342/378 |
| 2006/0218191 | A1 * | 9/2006 | Gopalakrishnan ......... | 707/104.1 |
| 2009/0028347 | A1 * | 1/2009 | Duraiswami et al. ........... | 381/26 |
| 2009/0279714 | A1 * | 11/2009 | Kim et al. ....................... | 381/92 |
| 2009/0304200 | A1 * | 12/2009 | Kim et al. .................. | 381/71.11 |
| 2010/0142327 | A1 * | 6/2010 | Kepesi et al. ................. | 367/124 |

OTHER PUBLICATIONS

Jacovitti, IEEE Transaction on Signal Processing, vol. 41, No. 2., Feb. 1993, p. 525-533.*
Peterson, Proceedings. (ICASSP '05) IEEE International Conference, 2005, pp. 1053-1056.*
Pinhanez, "The Everywhere Displays Projector: A Device to Create Ubiquitous Graphical Interfaces", IBM Thomas Watson Research Center, Ubicomp 2001, 18 pages.
Knapp, et al., "The Generalized Correlation Method for Estimation of Time Delay", IEEE Transactions on Acoustics, Speech, and Signal Processing, vol. ASSP-24, No. 4, Aug. 1976, pp. 320-327.
Valin, et al., "Robust Sound Source Localization Using a Microphone Array on a Mobile Robot", IEEE Proceedings of Intl. Conference on Intelligent Robots and Systems, Las Vegas, Nevada, Oct. 2003, pp. 1228-1233.

* cited by examiner

*Primary Examiner* — Luke Ratcliffe
*Assistant Examiner* — Hovhannes Baghdasaryan
(74) *Attorney, Agent, or Firm* — Lee & Hayes, PLLC

(57) ABSTRACT

Accurate and computationally efficient estimation of time delay of arrival data for localization of a sound source is described herein. A number of independent time delays are retained and validated through comparison with a set of dependent time delays. The method is robust against detrimental effects in the environment such as noise and reverberation. The resulting delays may then be used in sound source localization or other signal processing applications.

20 Claims, 7 Drawing Sheets

ESTIMATION OF TIME DELAY OF ARRIVAL

BACKGROUND

Acoustic signals such as handclaps or fingersnaps may be used as input within augmented reality environments. In some instances, systems and techniques may attempt to determine the locations of these acoustic sources within these environments. Prior to determining the location of the source, a set of time-difference-of-arrival (TDOA) is found, which can be used to solve for the source location. Traditional methods of estimating the TDOA are sensitive to distortions introduced by the environment and frequently produce erroneous results. What is desired is a robust method for estimating the TDOA that is accurate under a variety of detrimental effects including noise and reverberation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
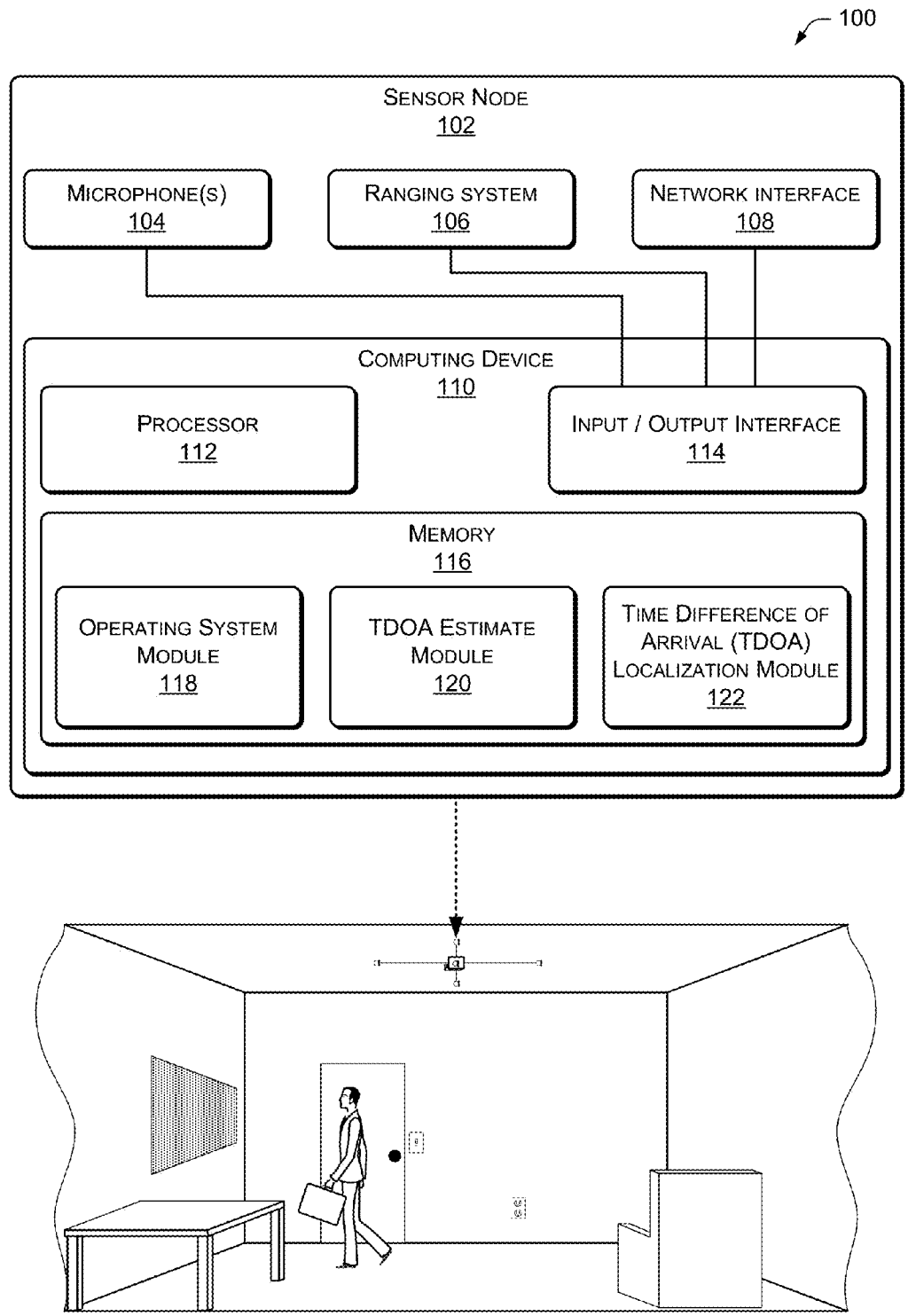
FIG. 1 shows an illustrative scene with a sensor node configured to determine spatial coordinates of an acoustic source which is deployed in an example room, which may comprise an augmented reality environment as described herein.

Augmented reality environments may utilize acoustic signals such as audible gestures, human speech, audible interactions with objects in the physical environment, and so forth for input. Detection of these acoustic signals provides for minimal input, but richer input modes are possible where the acoustic signals may be localized, or located in space. For example, a handclap at chest height may be ignored as applause while a handclap over the user's head may call for execution of a special function. The localization may be of acoustic signals propagated through a medium having a density less than 1000 kilograms per cubic meter. For example, gaseous air at about one standard atmosphere of pressure (about 100 kilopascals).

A plurality of microphones may be used to detect an acoustic source. By measuring the time of arrival of the acoustic signal at each of the microphones, and given a known position of each microphone relative to one another, time-difference-of-arrival data is generated. This time-difference-of-arrival (TDOA) data may be used for hyperbolic positioning to calculate the location of the acoustic source. The acoustic environment, particularly with audible frequencies (including those extending from about 300 Hz to about 3 KHz), are signal and noise rich. Furthermore, acoustic signals interact with various objects in the physical environment, including users, furnishings, walls, and so forth. These interactions may result in reverberations which in turn introduce variations in the TDOA data. These variations result in significant and detrimental changes to the calculated location of the acoustic source.

Disclosed herein are devices and techniques for determining the TDOA for a set of acoustic signals, and is based at least in part upon selection of time delays such that interference from reverberation is reduced or eliminated. The resultant TDOA values can be used in the calculation of the spatial coordinates of the acoustic source or other signal processing applications. Microphones may be disposed in a pre-determined physical arrangement having known locations relative to one another. An origin point may be specified relative to the microphones. The spatial coordinates of the acoustic source may then be defined relative to the origin. A TDOA estimate module is configured to select a set of time delays suitable for use by a TDOA-based localization module in determining spatial coordinates of the acoustic source.

As described herein, the TDOA estimate module is configured to estimate and select time-difference-of-arrival delays. The TDOA estimate module retains a number of independent time delays obtained through measurement of the signals received by the microphones 104. Comparison to a set of dependent time delays verifies these delays. These dependent time delays are also obtained through measurement of the signals received by the microphones. A sum of absolute difference measure is used to select a final retained time delay set. Within this retained time delay set, a set with a highest correlation sum is selected as a time delay for use in TDOA calculations. The retained time delay set is less sensitive toward adverse environment factors such as noise and reverberation, and when the time delay set is used in source location, the resultant spatial coordinates have higher accuracy.

Illustrative Environment

FIG. 1 shows an illustrative scene 100 of a room with a sensor node 102. The sensor node 102 is configured to determine spatial coordinates of an acoustic source in the room, such as may be used in an augmented reality environment. The sensor node 102 may be located at various locations around the room, such as on the ceiling, on a wall, on a table, floor mounted, and so forth.

As shown here, the sensor node 102 incorporates or is coupled to a plurality of microphones 104 configured to receive acoustic signals. A ranging system 106 may also be present which provides another method of measuring the distance to objects within the room. The ranging system 106 may comprise laser range finder, acoustic range finder, optical range finder, structured light module, and so forth. The structured light module may comprise a structured light source and camera configured to determine position, topography, or other physical characteristics of the environment or objects therein based at least in part upon the interaction of structured light from the structured light source and an image acquired by the camera.

A network interface 108 may be configured to couple the sensor node 102 with other devices placed locally such as within the same room, on a local network such as within the same house or business, or remote resources such as accessed via the internet. In some implementations, components of the sensor node 102 may be distributed throughout the room and configured to communicate with one another via cabled or wireless connection.

The sensor node 102 may include a computing device 110. The computing device 110 may comprise one or more processors 112, one or more input/output interfaces 114, and a memory 116. The memory 116 may store an operating system 118, time-difference-of-arrival (TDOA) estimate module 120, and TDOA-based localization module 122. In some implementations, the resources among a plurality of computing devices 110 may be shared. These resources may include input/output devices, processors 112, memory 116, and so forth. The memory 116 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

The input/output interface 114 may be configured to couple the computing device 110 to microphones 104, ranging system 106, network interface 108, or other devices such as an atmospheric pressure sensor, temperature sensor, hygrometer, barometer, an image projector, camera, and so forth. The coupling between the computing device 110 and the external devices such as the microphones 104 and the network interface 108 may be via wire, fiber optic cable, wirelessly, and so forth.

The TDOA estimate module 120 is configured to select time-difference of arrival delay values for use by the TDOA-based localization module 122. The TDOA-based localization module 122 is configured to use differences in arrival time of acoustic signals received by the microphones 104 to determine source locations of the acoustic signals. In some implementations the TDOA-based localization module 122 may be configured to accept data from the sensors accessible to the input/output interface 114. For example, the TDOA-based localization module 120 may determine time-differences-of-arrival based at least in part upon changes in temperature and humidity. As described below in more detail with regards to FIG. 4, the TODA estimate module 120 is configured to accept acoustic signals and determine TDOA delays associated with a source of the acoustic signals. For example, the TDOA estimate module 120 is used to minimize the degradation of estimated delay values due to reverberation within a room.

Figure 2:
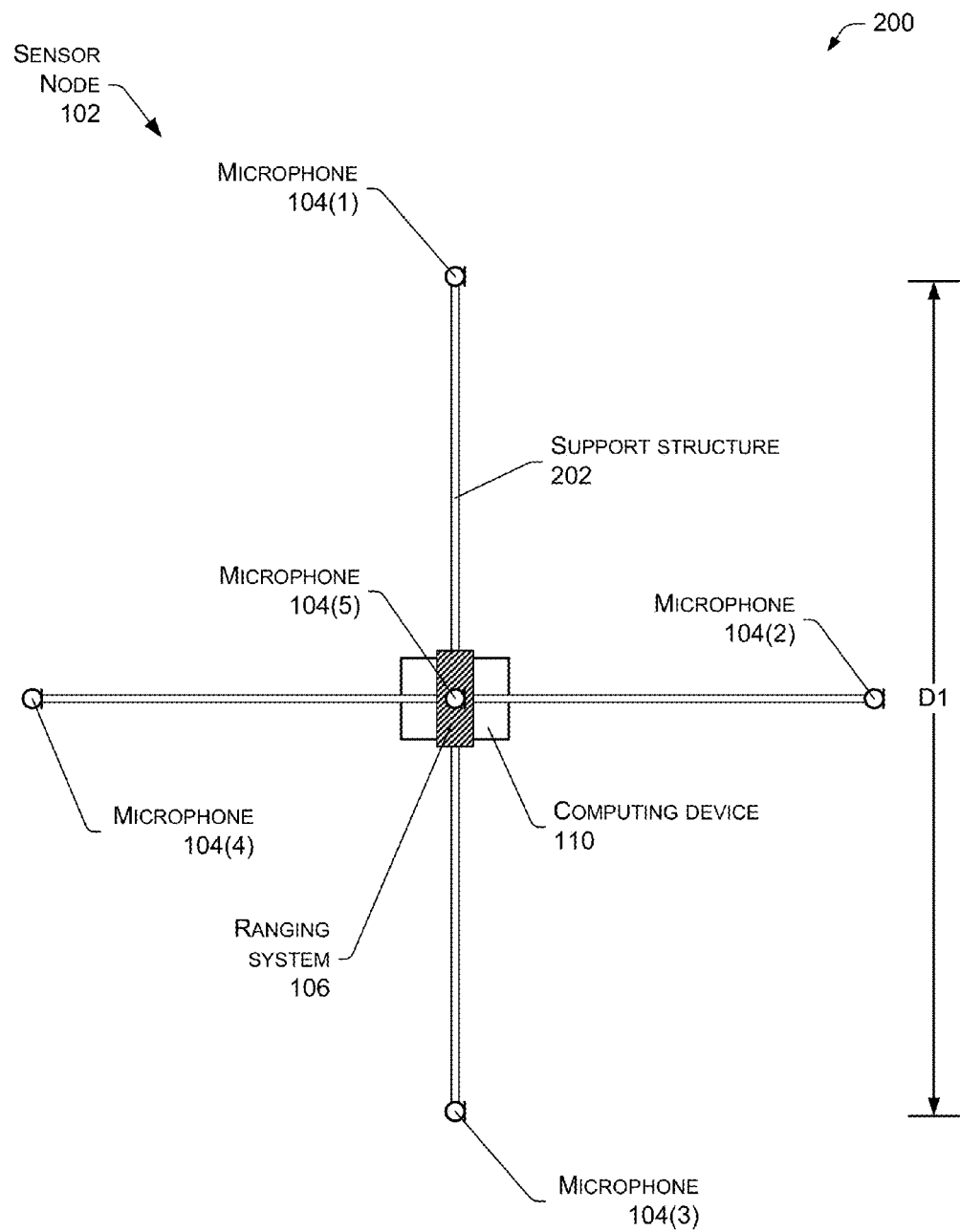
FIG. 2 shows an illustrative sensor node including a plurality of microphones deployed at pre-determined locations within the example room of FIG. 1.

FIG. 2 shows an illustration 200 of the sensor node 102. In this illustration a support structure 202 comprises a cross with two linear members disposed perpendicular to one another each having length of D1 and D2. The support structure 202 aids in maintaining a known pre-determined distance between the microphones which may then be used in the determination of the spatial coordinates of the acoustic source. Five microphones 104(1)-(5) are disposed at the center of the cross as well as at the ends of each arm of the cross. It is understood that the number and placement of the microphones 104 as well as the shape of the support structure 202 may vary. For example, in other implementations the support structure may describe a triangular, circular, or another geometric shape. In some implementations an asymmetrical support structure shape, distribution of microphones, or both may be used.

The support structure 202 may comprise part of the structure of a room. For example, the microphones 104 may be mounted to the walls, ceilings, floor, and so forth at known locations within the room. In some implementations the microphones 104 may be emplaced, and their position relative to one another determined through other sensing means, such as via the ranging system 106, structured light scan, manual entry, and so forth.

The ranging system 106 is also depicted as part of the sensor node 102. As described above, the ranging system 106 may utilize optical, acoustic, radio, or other range finding techniques and devices. The ranging system 106 may be configured to determine the distance, position, or both between objects, users, microphones 104, and so forth. For example, in one implementation the microphones 104 may be placed at various locations within the room and their precise position relative to one another determined using an optical range finder configured to detect an optical tag disposed upon each.

In another implementation, the ranging system 106 may comprise an acoustic transducer and the microphones 104 may be configured to detect a signal generated by the acoustic transducer. For example, a set of ultrasonic transducers may be disposed such that each projects ultrasonic sound into a particular sector of the room. The microphones 104 may be configured to receive the ultrasonic signals, or dedicated ultrasonic microphones may be used. Given the known location of the microphones relative to one another, active sonar ranging and positioning may be provided.

Figure 3:
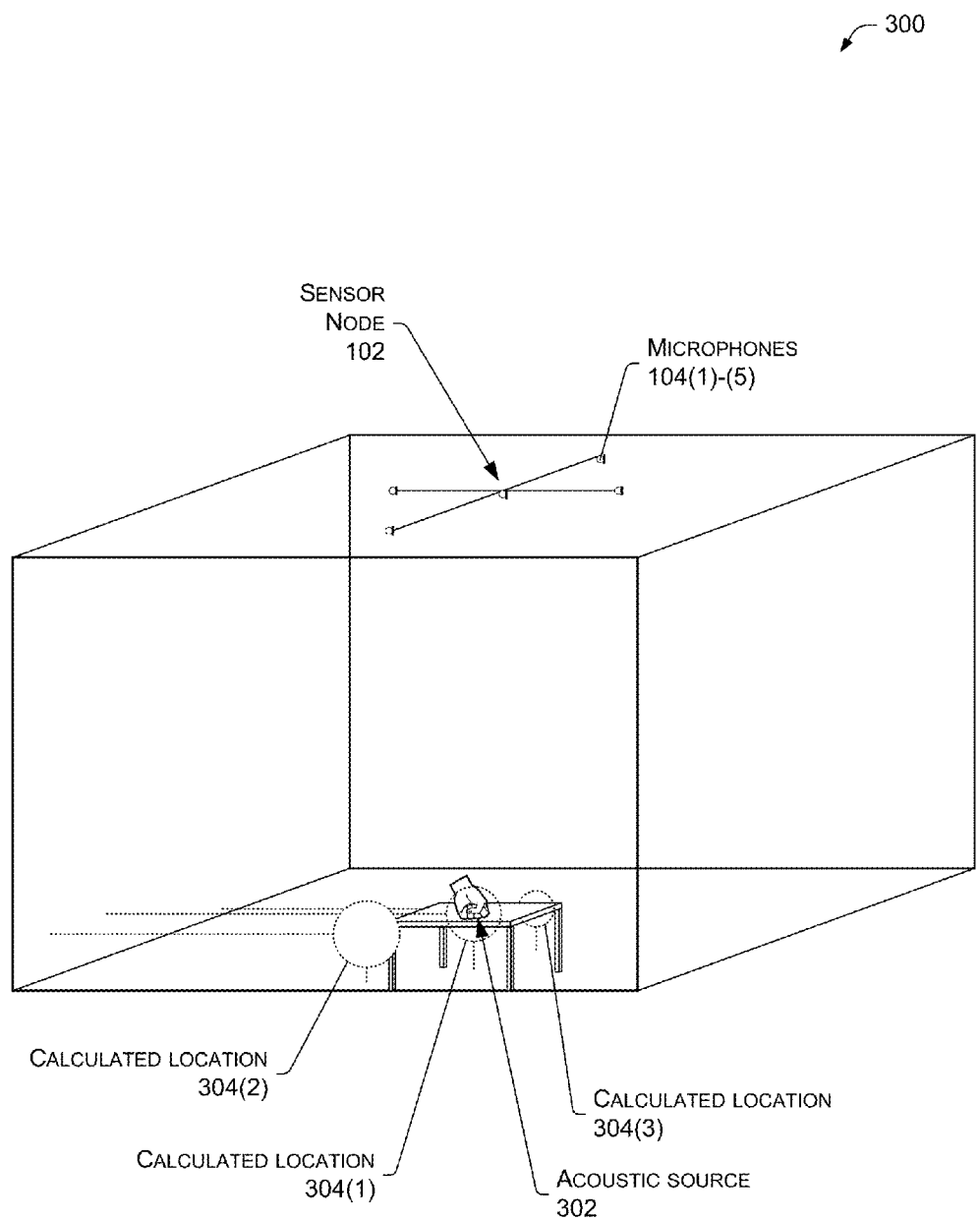
FIG. 3 depicts an illustrative volume including an acoustic source and a calculated location for the acoustic source.

FIG. 3 depicts an illustrative volume 300 such as a room. In this illustration, the sensor node 102 is disposed on the ceiling while an acoustic source 302, such as a first knocking on a tabletop generates an acoustic signal. This acoustic signal propagates throughout the room and is received by the microphones 104. Data from the microphones 104 about the signal is then passed along via the input/output interface 114 to the TDOA estimate module 120 in the computing device 110. The TDOA estimate module 120 uses the data to generate TDOA values. However, because of environmental conditions such as noise, reverberation, and so forth, TDOA values may vary. The TDOA-based localization module 122 uses the TDOA values to calculate a location. Thus, when TDOA values are incorrect, the calculated location of the acoustic source is incorrect. For example, reverberations of the sound within the room may result in several acoustic signals having different time delays upon detection by the microphones in the sensor node 102. These various time delays would result in the calculated locations being displaced about the volume. A calculated location 304(1) using the methods and techniques described herein corresponds closely to the acoustic source 302 because the detrimental effects of reverberations and noise are greatly reduced. In contrast, without the methods and techniques described herein, the other calculated locations 304(2) and 304(3) are erroneous due to reverberations of the acoustic signal from the tabletop, walls, floor, and ceiling.

Illustrative Processes

The following processes may be implemented by the architectures herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types.

The order in which the operations are described is not intended to be construed as a limitation, and any number of the described blocks can be combined in any order or in parallel to implement the processes. Furthermore, while the following process describes estimation of TDOA for acoustic signals, non-acoustic signals may be processed as described herein.

Figure 4:
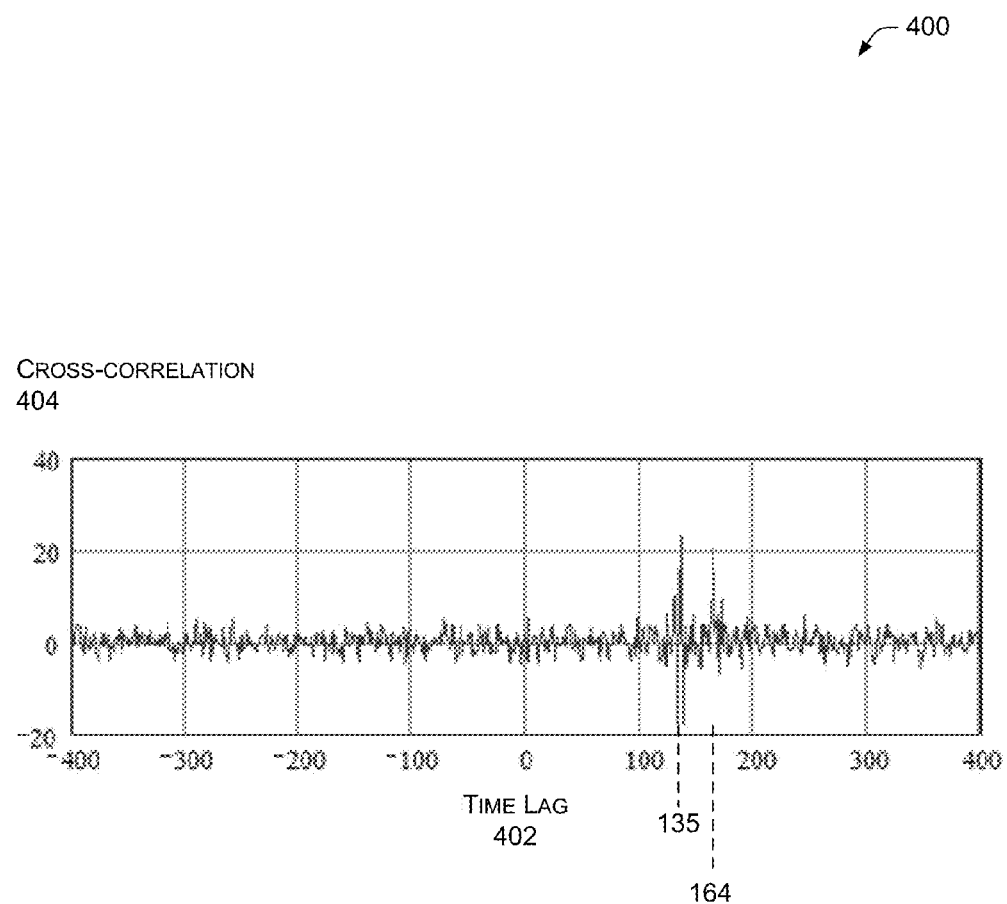
FIG. 4 depicts a graph of cross-correlation values for two illustrative signals calculated using phase transform.

FIG. 4 depicts a graph 400 of cross-correlation values calculated using a phase transform (PHAT) for two illustrative signals. For example, consider two signals, each received by a different microphone 104. Localization of the acoustic source relies on being able to determine that the same signal, or piece of a signal, has been received at different microphones. For example, if the acoustic signal is the user knocking on the table, we want to compare the same knock as received from two different microphones, and not a knock at one microphone and a fingersnap at another. Correlation techniques are used to determine if those signals received at different microphones match up.

In this graph we see time lag 402 measured in milliseconds (ms) along a horizontal axis and cross-correlation 404 along a vertical axis. Shown are two distinct peaks indicating that the signals have a high degree of cross-correlation. One peak is located at about 135 ms and another is located at about 164 ms. These peaks indicate that the two signals are very similar to one another at two different time lags.

Determining which peak to use is important in accurately localizing the source of the signal. In the optimal situation of an acoustic environment with no ambient noise and no reverberation, a single peak would be present. However, in real-world situations and sound reverberating from walls and so forth, multiple peaks such as shown here appear. Continuing our example, the sound of the user knocking on the tabletop may echo from a wall. The signal resulting from the reverberation of the knocking sound will be very similar to the sound of the knocking itself which arrives directly at the microphone. Inadvertent selection of the peak associated with the reverberation signal would result in a difference in the time lag. During localization, apparently small differences in determining the delay between signals may result in substantial errors in calculated location. For example, given standard pressure and temperature of atmospheric air having a speed of sound of about 340 meters/second, a difference of 29 ms between the two peaks in this graph may result in an error of about 9.8 meters.

Given two signals denoted by $s_0[n]$, $s_1[n]$, $n=0$ to $M-1$ where n is an integer representing a time index and M is the total number of samples. The cross-correlation for the two signals at a time lag m may be calculated with $$E\{s_1[n]s_0[n-m]\} = \frac{1}{M-m}\sum_{n=m}^{M-1} s1[n]s_0[n-m]. \quad \text{(EQUATION 1)}$$

A high cross-correlation at a time lag m implies that the two signals are very similar when the first signal is shifted by m time samples with respect to the second signal. On the other hand, if the cross-correlation is low or negative, it implies that the signals do not share similar structure at a particular time lag. It is thus worthwhile to select the peak which reflects the acoustic signal and not the reverberation, as described next.

Figure 5:
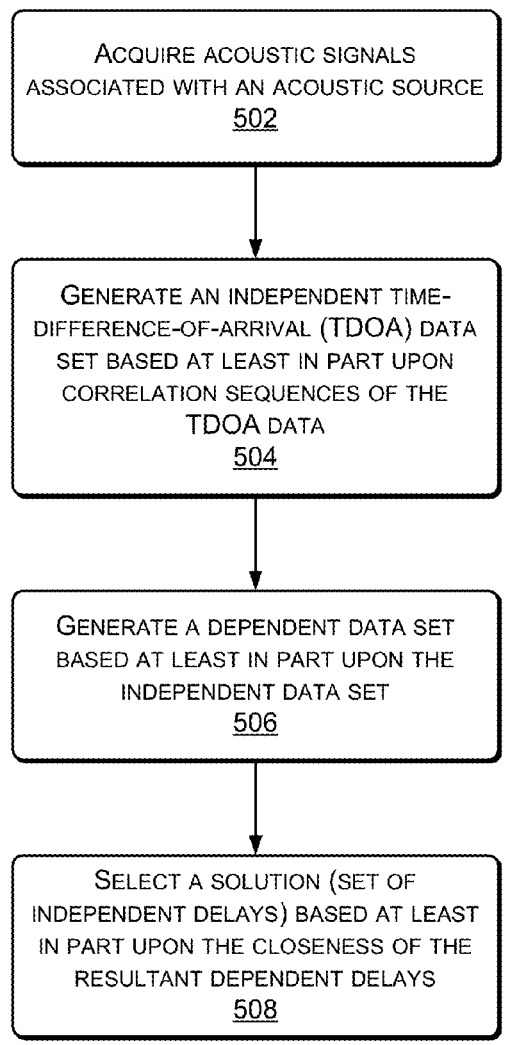
FIG. 5 is an illustrative process of selecting time delays for use in time-difference-of-arrival calculations.

FIG. 5 is an illustrative process 500 of selecting time delays for use in time-difference-of-arrival calculations. This process examines multiple peaks in cross-correlation sequences in order to find final time delay estimates suitable for use by the TDOA localization module 122.

At 502, the acoustic signals associated with an acoustic source are received. For example, the plurality of microphones 104 may receive the acoustic signals. Due to differences in the distance between the acoustic source and each of the microphones, each microphone detects the signal at differing times. The signals detected at each microphone may also include noise or signal degradation such as reverberations.

At 504, an independent TDOA data set based at least in part upon correlation sequences of the acoustic signals is generated. Given N sensors and their associated signals $s_i[n]$, $i=0$ to $N-1$ where i is the index of the microphone and n is a time index, the following correlation sequences may be calculated $$E\{s_1[n]s_0[n-m]\},$$

$$E\{s_2[n]s_0[n-m]\},$$

$$\vdots$$

$$E\{s_{N-1}[n]s_0[n-m]\},$$

with E denoting a statistical expectation operation or an average operation. A total of $(N-1) \times M$ independent delays (l) with associated correlation values (R) referred to as the independent data set is then found:

$$l_{i,0}^{(k)}, R_{i,0}^{(k)}, i=1 \text{ to } N-1, k=0 \text{ to } M-1 \quad \text{(EQUATION 2)}$$

with M being a parameter.

At 506, a dependent data set is generated based at least in part upon the independent data set. To locate the delay values, the M largest peaks of each correlation sequence are retained. Once the values in Equation 2 are known, there are $M^{N-1}$ possible solutions. Each tentative solution comprises $N-1$ delay values with the ith delay value ($i=1$ to $N-1$) drawn from one of the M available choices ($k=0$ to $M-1$).

At 508, a solution comprising a set of independent delays is selected based at least in part upon a closeness of the resultant dependent delays. To determine a solution, correlation sequences are calculated as follows:

$$E\{s_i[n]s_j[n-m]\}, j=1 \text{ to } N-2, i=j+1 \text{ to } N-1$$

or a total of $$1+2+3+\ldots+(N-2) = \frac{(N-2)(N-1)}{2}$$

sequences.

From these sequences, the following delays/correlations referred to as a dependent data set are extracted:

$$l_{i,j}^{(k)}, R_{i,j}^{(k)}, j=1 \text{ to } N-2, i=j+1 \text{ to } N-1, k=0 \text{ to } M-1 \quad \text{(EQUATION 3)}$$

Based on Equation 2 and Equation 3, determination of a solution is as follows:

A) for $p \leftarrow 0$ to $M^{N-1}$

B) The available independent delays are $l_{i,0}$, $i=1$ to $N-1$.

C) Derive dependent delays: $l_{i,j} \leftarrow l_{i,0} - l_{j,0}, j=1$ to $N-2, i=j+1$ to $N-1$.

D) For each $l_{i,j}$ find $k_{i,j}$ so that $$k_{i,j} = \arg\min_k |l_{i,j} - l_{i,j}^{(k)}|$$

E) A first metric for the pth solution is $$\Delta l \min_p = \sum_{j=1}^{N-2} \sum_{i=j+1}^{N-1} \left| l_{i,j} - l_{i,j}^{(k_{i,j})} \right| \quad \text{(EQUATION 4)}$$

which reflects the closeness between the calculated dependent delays with respect to those found directly from the signals.

F) A second metric for the pth solution is $$R_p = \sum_{i=1}^{N-1} R_{i,0} + \sum_{j=1}^{N-2} \sum_{i=j+1}^{N-1} R_{i,j}^{(k_{i,j})}. \quad \text{(EQUATION 5)}$$

Based on the results of Equation 4 and Equation 5, K solutions having the lowest Δlmin are located and selected. Among these selected solutions, one solution having a highest R is the solution. The process thus results in selection of a solution comprising a set of independent delays based on the closeness of the resultant dependent delays with respect to those found from the signals and the total correlation sum of the resultant set of delays.

In some circumstances, cross-correlation values obtained through PHAT may have high peaks that are not observed when directly computing the cross-correlation values. These peaks are therefore not desirable and may be rejected from further consideration.

Figure 6:
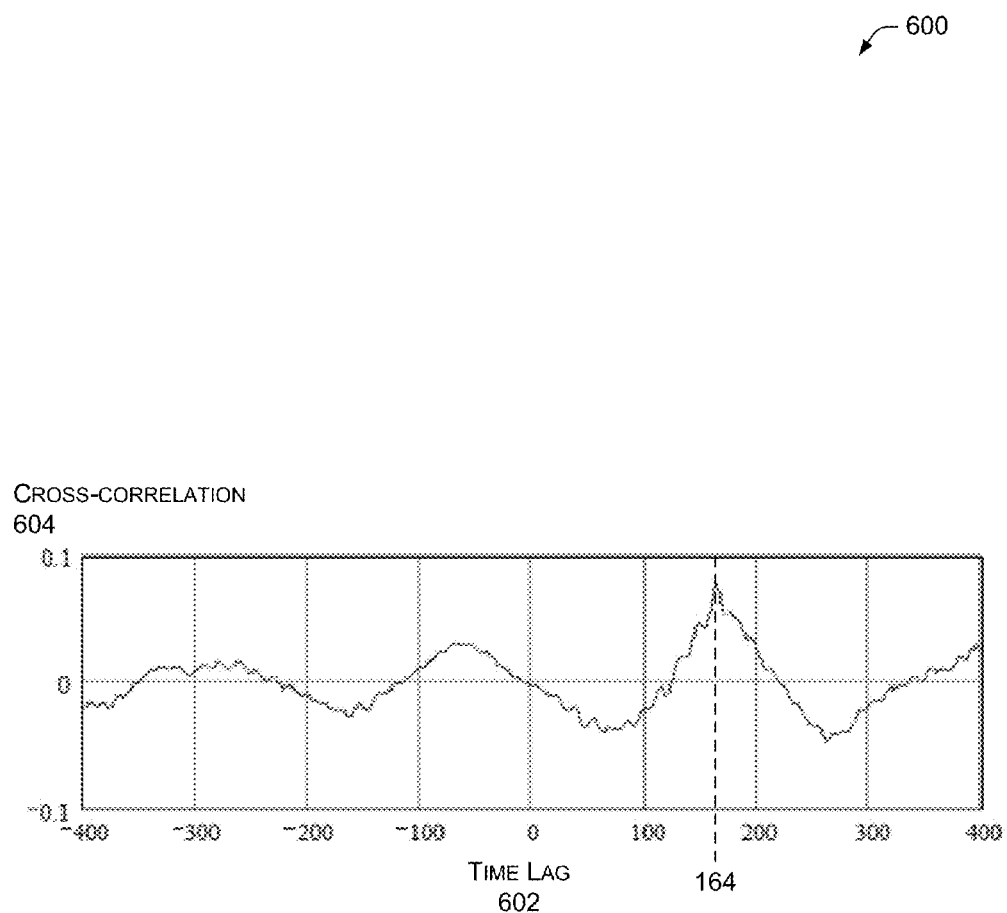
FIG. 6 depicts cross-correlation values generated by direct calculation for the two illustrative signals.

FIG. 6 depicts cross-correlation values generated by direct calculation for the two illustrative signals of FIG. 4. In this figure, time lag 602 measured in milliseconds (ms) extends along a horizontal axis while cross-correlation 604 extends along a vertical axis. A maximum value of a curve shown here occurs at about a time lag of 164 ms. In some implementations, negative correlations and associated negative peaks are disregarded as indicating dissimilarity. Unlike in FIG. 4, at time lag 135 ms no peak is present in this direct correlation sequence. By verifying the status of a peak with the direct correlation values, peaks which are unlikely to be the solution may be easily rejected. This verification is described below in more detail with regards to FIG. 7.

Figure 7:
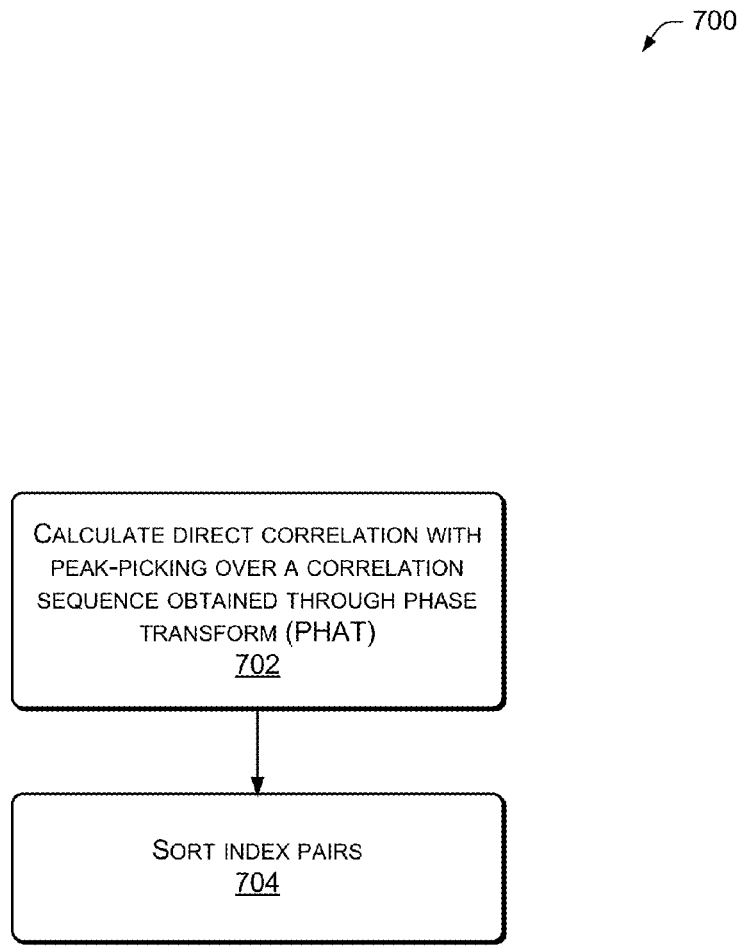
FIG. 7 is an illustrative process of selectively rejecting from consideration cross-correlation peaks.

FIG. 7 is an illustrative process 700 of selectively rejecting from consideration cross-correlation peaks. Direct correlation calculation is computationally expensive. To maximize throughput and minimize demands on the processor 112, use of direct correlation may be limited to a few values of time lag. Peaks found from the PHAT or other correlation sequence are confirmed using direct correlation calculation.

At 702, direct correlation with peak-picking over a correlation sequence obtained through phase transform is calculated with the goal of finding the following arrays:

$$l_{i,j}^{(k)}, R_{i,j}^{(k)}, Rd_{i,j}^{(k)}, j=0 \text{ to } N-2, i=j+1 \text{ to } N-1, k=0 \text{ to } Mi-1 \quad \text{(EQUATION 6)}$$

where Mi>M is an initial number of candidates. Correlation values R are found with peak-picking over the correlation sequence obtained through PHAT. Direct correlation values Rd are found from the known delay/lag values, where the signals are correlated directly in the time domain. As a result, in some implementations only Mi direct correlation calculations are executed per index pair.

At 704, for each index pair {j, i} in Equation (6), the three arrays indexed by k are re-ordered, where Rd is sorted from large to small or positive to negative, with l and R re-ordered according to the resultant order of Rd.

Once the previous steps are executed, the process continues in the same fashion as described above with regards to FIG. 5. This allows confirmation as to validity of a peak from its direct correlation value without wasting computation excessively. Choosing an appropriate Mi balances accuracy with computational demand. In one implementations, for M=4 a setting of Mi=6 provides good results.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. One or more non-transitory computer-readable media storing computer-executable instructions that, when executed, cause one or more processors to perform acts comprising:

receiving signals s from N sensors $s_i[n]$, i=0 to N−1 where i is an index of a sensor and n is a time index;

calculating, using a first type of correlation, N−1 correlation sequences $E\{s_i[n]s_0[n-m]\}$ for i=1 to N−1 where m is a time lag;

calculating an independent data set by finding a total of (N−1)×M independent delays (l) with associated correlation values (R) where $l_{i,0}^{(k)}$, $R_{i,0}^{(k)}$, i=1 to N−1, k=0 to M−1;

confirming, using a second type of correlation, Mi largest peaks found using the first type of correlation, the second type of correlation being direct correlation;

retaining M largest peaks of the correlation sequences confirmed using the second type of correlation, where M is a parameter and Mi>M;

determining a valid solution from a set of tentative solutions comprising N−1 delay values with an ith delay value (i=1 to N−1) drawn from one of the $M^{N-1}$ possibilities and M available choices (k=0 to M−1) by:

calculating correlation sequences $$E\{s_i[n]s_j[n-m]\}, j=1 \text{ to } N-2, i=j+1 \text{ to } N-1;$$

extracting a dependent data set comprising $$l_{i,j}^{(k)}, R_{i,j}^{(k)}, j=1 \text{ to } N-2, i=j+1 \text{ to } N-1, k=0 \text{ to } M-1; \text{ and}$$

selecting a solution.

2. The one or more non-transitory computer-readable storage media of claim 1, wherein the selecting the solution comprises:

for p←0 to $M^{N1}$ where available independent delays are $l_{i,0}$, i=1 to N−1, deriving dependent delays $l_{i,j} \leftarrow l_{i,0} - l_{j,0}$, j=1 to N−2, i=j+1 to N−1 for each $l_{i,j}$, find $k_{i,j}$ so that;

$$k_{i,j} = \arg\min_k |l_{i,j} - l_{i,j}^{(k)}|;$$

determining a first metric for a pth solution, the first metric comprising $$\Delta lmin_p = \sum_{j=1}^{N-2}\sum_{i=j+1}^{N-1}\left|l_{i,j}-l_{i,j}^{(k_i,j)}\right|;$$

determining a second metric for a pth solution, the second metric comprising $$R_p = \sum_{i=1}^{N-1} R_{i,0} + \sum_{j=1}^{N-2}\sum_{i=j+1}^{N-1} R_{i,j}^{(k_i,j)};$$

based at least in part upon the first metric and second metric, locating K solutions having the lowest Δlmin; and selecting from among the K solutions the one having the highest R as a solution.

3. The one or more non-transitory computer-readable storage media of claim 1, wherein the direct correlation Rd is calculated from the signals resulting in the arrays $l_{i,j}^{(k)}, R_{i,j}^{(k)}, Rd_{i,j}^{(k)}, j=0$ to $N-2, i=j+1$ to $N-1, k=0$ to $Mi-1$.

4. The one or more non-transitory computer-readable storage media of claim 3, wherein correlation values R are found with peak-picking over the correlation sequences obtained through the first type of correlation, the first type of correlation being phase transform.

5. The one or more non-transitory computer-readable storage media of claim 3, wherein direct correlation values Rd are found from known lag values and where the signals are correlated directly in a time domain.

6. The one or more non-transitory computer-readable storage media of claim 3, wherein only Mi direct correlation calculations are executed per index pair.

7. The one or more non-transitory computer-readable storage media of claim 3, wherein for each index pair three arrays indexed by k are re-ordered, where direct correlation values Rd is sorted, and with l and R re-ordered according to a resultant order of Rd.

8. The one or more non-transitory computer-readable storage media of claim 1, wherein the selecting the solution is based at least in part on:
a first metric indicative of closeness between dependent delays derived based at least in part on the independent delays for an individual tentative solution and dependent delays found from the correlation sequences of the individual tentative solution; and
a second metric that is based at least in part on a total correlation value of the independent data set and the dependent data set of the individual tentative solution.

9. One or more non-transitory computer-readable media storing computer-executable instructions that, when executed, cause one or more processors to perform acts comprising:
receiving signals at a plurality of sensors;
calculating one or more correlation sequences from the received signals using a phase transformation correlation;
calculating an independent data set by finding independent delays (l) with associated phase transformation correlation values (R) from the one or more correlation sequences;
confirming Mi largest peaks found during phase transformation correlation using direct correlation;
retaining M largest peaks of the one or more correlation sequences confirmed using direct correlation, where M is a parameter and Mi>M;
extracting a dependent data set from the independent data set; and
selecting a solution from the dependent data set.

10. The one or more non-transitory computer-readable storage media of claim 9, the acts further comprising selecting a set of tentative solutions comprising N−1 delay values with an ith delay value (i=1 to N−1) drawn from one of the $M^{N-1}$ possibilities and M available choices (k=0 to M−1) by calculating correlation sequences $E\{s_i[n]s_j[n-m]\}, j=1$ to $N-2, i=j+1$ to $N-1$.

11. The one or more non-transitory computer-readable storage media of claim 9, wherein the dependent data set comprises $l_{i,j}^{(k)}, R_{i,j}^{(k)}, j=1$ to $N-2, i=j+1$ to $N-1, k=0$ to $M-1$.

12. The one or more non-transitory computer-readable storage media of claim 9, wherein selecting the solution comprises:
for p←0 to $M^{N-1}$ where the available independent delays are
$l_{i,0}$, i=1 to N−1, deriving dependent delays
$l_{i,j} \leftarrow l_{i,0}-l_{j,0}$, j=1 to N−2, i=j+1 to N−1 for each $l_{i,j}$, find $k_{i,j}$ so that;

$$k_{i,j} = \arg\min_k |l_{i,j}-l_{i,j}^{(k)}|;$$

determining a first metric for a pth solution, the first metric comprising $$\Delta lmin_p = \sum_{j=1}^{N-2}\sum_{i=j+1}^{N-1}\left|l_{i,j}-l_{i,j}^{(k_i,j)}\right|;$$

determining a second metric for the pth solution, the second metric comprising $$R_p = \sum_{i=1}^{N-1} R_{i,0} + \sum_{j=1}^{N-2}\sum_{i=j+1}^{N-1} R_{i,j}^{(k_i,j)};$$

based at least in part upon the first metric and second metric, locating the K solutions having the lowest Δlmin; and
selecting from among the K solutions the one having the highest R as a solution.

13. The one or more non-transitory computer-readable storage media of claim 9, wherein the direct correlation Rd is calculated from the signals resulting in the arrays $l_{i,j}^{(k)}, R_{i,j}^{(k)}, Rd_{i,j}^{(k)}, j=0$ to $N-2, i=j+1$ to $N-1, k=0$ to $Mi-1$.

14. The one or more non-transitory computer-readable storage media of claim 13, wherein correlation values R are found with peak-picking over the correlation sequence obtained through phase transform.

15. The one or more non-transitory computer-readable storage media of claim 13, wherein direct correlation values Rd are found from known lag values and where the signals are correlated directly in a time domain.

16. The one or more non-transitory computer-readable storage media of claim 13, wherein for each index pair, three arrays indexed by k are re-ordered, where direct correlation values Rd are sorted, with l and R re-ordered according to a resultant order of Rd.

17. The one or more non-transitory computer-readable storage media of claim 9, wherein the selecting the solution is based at least in part on:
a first metric indicative of closeness between dependent delays derived based at least in part on the independent delays for an individual tentative solution and dependent delays found from the correlation sequences of the individual tentative solution; and
a second metric that is based at least in part on a total correlation value of the independent data set and the dependent data set of the individual tentative solution.

18. A system comprising:
a plurality of sensors; and
a time-difference-of-arrival estimation module coupled to the sensors and configured to:
receive signals from the plurality of sensors;
calculate a correlation sequence from the received signals;
calculate an independent data set by finding independent delays (l) with associated correlation values (R) from the correlation sequence;
extract a dependent data set from the independent data set; and
select a solution from the dependent data set comprising:
for p←0 to $M^{N-1}$ where available independent delays are $l_{i,0}$, i=1 to N−1, derive, for M available choices (k=0 to M−1), dependent delays
$l_{i,j}$←$l_{i,0}$−$l_{j,0}$, j=1 to N−2, i=j+1 to N−1 for each $l_{i,j}$, find $k_{i,j}$ so that;

$$k_{i,j} = \arg\min_k |l_{i,j} - l_{i,j}^{(k)}|;$$

determine a first metric for a pth solution, the first metric comprising $$\Delta l\min_p = \sum_{j=1}^{N-2}\sum_{i=j+1}^{N-1} |l_{i,j} - l_{i,j}^{(k_{i,j})}|;$$

determine a second metric for the pth solution, the second metric comprising $$R_p = \sum_{i=1}^{N-1} R_{i,0} + \sum_{j=1}^{N-2}\sum_{i=j+1}^{N-1} R_{i,j}^{(k_{i,j})};$$

and
based at least in part upon the first metric and second metric, locate the K solutions having the lowest Δlmin, then among these selected solutions selecting the one having the highest R as a solution.

19. The system of claim 18, wherein the sensors comprise microphones.

20. The system of claim 18, wherein the difference-of-arrival estimation module is further configured to confirm one or more peaks found during the phase transformation correlation using direct correlation.

* * * * *